METHOD OF MAKING ORNAMENTAL PLASTICS AND RESULTANT PRODUCT

Daniel A. Fischler, New Hyde Park, N.Y., assignor, by mesne assignments, to Emsig Manufacturing Corp., New York, N.Y., a corporation of New York
No Drawing. Filed Sept. 22, 1961, Ser. No. 141,240
7 Claims. (Cl. 264—73)

This invention relates to a method for making ornamental plastics, more particularly ornamental pearlized plastics.

It has been proposed to provide stock for making pearlized synthetic plastics by the addition of nacreous material comprising platelets or lamallae of fish scales or its organic or inorganic substitutes, such as lead carbonate crystals, including metallized particles, thereby to secure integral sheen or a three-dimensional internal sheen effect of the nacreous material, more specifically to simulate mother-of-pearl. The realistic simulation of mother-of-pearl, insofar as achieving both internal sheen and irridescence of the range of spectral colors characteristic of some natural mother-of-pearl has not heretofore been achieved. Attempts superficially to apply dyestuffs to the surface of plastics were quickly detectable because of wear, or by reason of surface exposure of the products. Likewise, such superficial applications of dyestuff failed to achieve the realism of the internal, multi-colored irridescent effects of natural mother-of-pearl in the plastics employed because of the uniformity and regularity of color distribution in applying or adding dyestuffs to the plastic at the intermediate stage.

My invention has for its object to provide the enhanced pearlized effect of mother-of-pearl in synthetic plastics which simulates not only the internal sheen of the addition of a nacreous material but also the orient and whorl appearance characteristics of highly desirable mother-of-pearl, which includes internal tubercles or nodules, about which the characteristic multi-color irridescence may be observed.

More specifically, it is an object of my invention to provide a mother-of-pearl effect in thermo-setting synthetic plastics, of which the so-called unsaturated polyester resins are examples, with an internal sheen by use of a nacreous material, and to incorporate in such translucent or transparent component, nodose effects by having intermediate striations of multi-colors of three dimensions, simulating the orient as well as the iridescent coloration of highly desirable and ornamental mother-of-pearl.

According to my invention, multi-color effects, including the heterogeneous influence of light reflectance characteristics of mother-of-pearl, may be secured by dyes, the rate at which such dyes are disseminated and absorbed being controlled by their solubility factors in relation to a flow pattern in distributing the dye component about mechanical lines in disseminating irregular bodies or light refractors, about which flow patterns of striae are outlined in the procedure of incorporating the nodose simulating pattern.

In accordance with my invention specifically, I may provide these materials with highly ornamental effects simulating multi-color iridescent mother-of-pearl, by combining with relatively transparent polyester resin at an intermediate stage, a nacreous material and nodule outlining components in the form of partially or completely cured granules which serve as the medium around which visible flow patterns are created in the distribution of these particles, and during the distribution of these particles and the plastic menstruum carrying the same into the sheet or surface body, to cause a distribution of the coloring material desired to simulate the colored iridescence in striations. These aforementioned pronounced linear outlines along the whorls created by the flow patterns may be achieved with a highly desirable ornamental effect more specifically, by limiting the rate of solubility of the coloring component or dye and its distribution under conditions of controlled solubility of the dyes employed creates unusually attractive patterns of striated iridescence in pearlized synthetic plastics under the control of the flow motion of distributing the menstruum, with the nodule forming filler carrying the dye or the dye particles themselves, or mixtures of dyes or pigments.

The achievement of heterogeneous color effects, particularly to secure localized areas, striae, in the presence of the nacreous material producing internal sheen, to secure intensified color value, is particularly achieved by me, with the use of transparent polyester resinous materials by advancing the polymerization to a degree that the desired dye, in its undissolved, particulated condition, is difficultly soluble in the menstruum, so that the slow migration of the dye occurs in the menstruum, leaving a pattern along the flow lines of distribution or incorporation, so that before the gel or setting time has been achieved, complete, uniform diffusion does not take place, or the product may be set by hardening, or cured to the infusible stage with visible dye flow line patterns, before complete, uniform diffusion and solution is effected by the dye alone or upon a carrier.

I have found that both the whorl appearance of mother-of-pearl as well as the orient of multi-colors may be secured by incorporating in the liquid resin having a nacreous material, to secure a pearlized effect, cured and granulated particles of the same or a compatible plastic acting as a carrier of the pigment or dye in a dry state and of a nature that it is difficulty soluble in the menstruum of the synthetic plastic resinous mass in which it is incorporated so that in the incorporation of the particles, a migration of the color in striae, depending upon the flow lines of admixture or distribution, occurs and is visible in the set plastic.

By the choice of dye or pigment so that it is difficultly or slowly soluble in the menstruum, or the advancement of the plastic to a stage where the dye is difficultly or slowly soluble in the menstruum, or a combination of the two, highly ornamental effects are attainable. Further, a wide variety of ornamental striations, whorls, mottling may be achieved by the heterogeneous light altering effects of the flow patterns in incorporated graded carrier particles for the pigments or dyes, which also result in ornamental, nodule-like effects characteristic of natural mother-of-pearl.

In the incorporation of the undissolved dye or difficultly soluble pigment in accordance with my invention at an intermediate stage before gelation of the pearlized plastic, preferably superficially on a carrier of granulated particles of plastic cured beyond the gelation stage, a variety of distribution methods now known for achieving orientation of the nacreous platelets, whether fish scales, organic or known inorganic substitutes therefor, include film or sheet formers by spreading the composite upon a support or backing, relying upon the known spreading action in distributing the menstruum to orient the nacreous material to secure internal sheen, such as the cell method wherein the partially cured synthetic plastic is slowly poured between a cell made of spaced glass or like plates, between which plates the flowing mixture tends to orient the nacreous material with the longest dimension in parallelism with the sides of the plates, or in the centrifugal casting of the liquid resin before gelation internally of a revolving drum, which aids in distributing the nacreous material to orient the longest dimension in parallelism with the drum surface, thereby to increase the number of nacreous particles in parallelism to the drum surface.

Extrusion in molds along parallel plates or other methods for making sheets or solids for accentuating the degree of orientation of the nacreous material will be readily apparent and are contemplated, preferably where there is a relative movement of the batch to a supporting component. However, this application concerns itself primarily with the ornamental effects produced by the flow lines of the relative movement of the particles of dye, specifically in their dry state to perpetuate the path of migration of the dye, and more particularly on a carrier in incorporating the dye in this form to produce contrasting ornamental striae or whorls by the slow dissemination or migration of the colored particles in the plastic menstruum short of uniform dissemination.

In accordance with my invention, I may still further accentuate the ornamental effects of incorporating localized colored areas, specifically striae, in making the same in sheets by providing such sheets with underlying layers in the course of the procedure for making the sheets, such as by applying a differently colored translucent or opaque layer acting as a background for the first ornamented layer, and secure a still further variety of ornamental combination, accentuating the appearance of the first layer, and still further simulating the highly desirable natural mother-of-pearl.

My invention will be illustrated in connection with plastic sheeting utilized in making buttons wherein the synthetic resinous material is made into sheets, from which button blanks are cut or stamped or outlined in the sheet, to be later sawed or stamped therefrom, preferably at an intermediate stage of cure, to a degree of softness depending on storage facilities. However, the sheets may progress to the point of reaching the cured stage, and circular blanks for buttons are stamped out, punched, sawed by cylindrically shaped saws, after which the blanks are drilled, faced and polished.

Broadly, the unsaturated polyester synthetic resinous compositions or thermosetting vinyl material illustrated in the United States patents to Sucher 2,652,597, Sept. 22, 1953, and Dangelmajor, 2,643,983, June 30, 1952, are suitable for use. These patents each disclose liquid mixtures of thermosetting, unsaturated liquid polyester resin with an unsaturated liquid compound having an ethylene group $CH_2=C<$ linkage as examples of the class of thermosetting resins which may be used either before or after prepolymerization with which this application concerns itself. The unpolymerized resins, partially prepolymerized or fully prepolymerized to maximum viscosity before gelation may be employed, with modifications thereof depending upon the manner in which said resin is shaped, i.e. molding by compression, cell casting, extrusion, centrifugal casting, belt or drum spreading, rolling, etc., and with modification for machinability, such as by the additions of less brittle fractions of this resin, the technique of which is now well understood by the skilled worker in this field.

In addition, one manner of practicing my invention in the production of button stock is to form the resinous material into layers to form a composite sheet, i.e. a substratum and a surface layer, the substratum being desirably opaque and of selected hue and the surface layer carrying the more ornamentally enhanced nacreous material of internal pearlized sheen. To exemplify this, there are first prepared three batches, I a backing material for the substratum, II a surfacing layer, III a mottler, striater or carrier. The example given is for forming a 45 ligne button.

Part I.—Backing material or substratum

The first part to form a relatively opaque layer or substratum of distinguishing color is prepared as follows:

(1) A thermosetting vinyl polymer, generally referred to as a polyester resin, an example of which is supplied by Pittsburgh Plate Glass Company under its trademark Selectron 5003, is flexibilized for machinability with (2) A flexible polyester resin, i.e. one having a high ratio of saturated di-basic acid to unsaturated di-basic acid, such as adipic acid, an example of which is Plaskon 9600 made by the Allied Chemical Company. To the resin mixture is added (3) 1% of a white color paste dispersion, an example of which is titanium dioxide ground into a paste in a polyester resin of low viscosity, an example of which is Acheson White PYR 3661;

(4) 2% nacreous material, an example of which is Nacromer CAL, a synthetic pearl essence produced by Mearl Corporation, which is basic lead carbonate crystallized to simulate fish scales (5) Light stabilizer, 0.1%, an example of which is 2-hydroxy-4 methoxybenzophenone.

(6) Gelation may be promoted with a room temperature system, in which 1 to 2% methyl-ethyl-ketone peroxide in dimethyl phthalate (60% strength) is employed.

(7) An accelerator comprising 0.01 to 0.05% of a 6% cobalt naphthanate solution is used.

Part II.—Surfacing layer (1) A thermosetting vinyl polymer, preferably flexibilized, has added to it (2) 3% of a synthetic pearl essence, an example of which is Nacromer YPH, produced by Mearl Corporation, consisting of a mixture of basic lead carbonate crystals and basic zinc carbonate crystals (3) 0.1% of a light stabilizer, an example of which is 2-hydroxy-4 methoxybenzophenone.

(4) Gelation of this batch is promoted with a room temperature system, using 1 to 2% of a solution of 60% methyl-ethyl-ketone peroxide in dimethyl phthalate (5) Accelerated by 0.01 to 0.05% of a 6% cobalt naphthanate solution.

(6) If a whiter product is desired, 2 grams to 200 pounds total resin mix of Tinopal E made by Geigy Chemical Co. under United States Patent No. 2,784,180 may be added.

Part III.—Mottler or striater or carrier

For this component, irregularly shaped pieces of cured, already pearlized polyester are used. The composition of these pieces is to utilize the cured scrap of Part II. This material is ground up to pass a 3/33 mesh screen but to be retained on a 2/33 mesh screen. The concentration per sheet for producing a 45 ligne button is about 0.7% of the weight of Part II.

To these particles, color is added superficially to coat the surface, merely using the cured resinous particles as a temporary dye carrier. The application is achieved by evaporating on the particles oil soluble dyes in a solvent for the dye which is not a solvent for the particles. This also may be achieved by rolling the cured carrier particles in the powdered dye or pigment or the coating may be applied with a dye solution by spraying, so long as the solvent for the dye is such a solvent for the particles as to concentrate the dye on the surface of the cured resin particles.

To prevent the surface dyeing or staining of the particles themselves, they may be first covered with a film of polyvinyl alcohol, as an example of a barrier separator between the dye and the particles of cured resin. This initial treatment of the particles results in the optical merging at their surface of the particles when added with the resinous mass of Part II, which will not be clearly visible except for the flow lines which are created.

The color factors of the dye pigment may be a single color or a combination of colors, and where very fine graining is desired, the pigment in dry form may be utilized in part without any carrier, the size of the dye particle determining the degree of fineness of the graining.

The dyes or pigments selected in connection with the polyester resins exemplified in Parts I and II are those non-polar dyes which are slowly soluble in the unpolymerized resinous batch, examples of which are normally azo and anthraquinone chemicals which are soluble in organic solvents. These are Oil Red C 1258, Oil Yellow C 119, Oil Orange C 124, Sudan Violet R15, Sudan Green BB13. (See the Chemistry of Synthetic Dyes and Pigments by H. A. Lubs, copyright 1955, published by Reinhold Publishing Corp., pages 175, 176.) The solvent employed is acetone, styrene, toluene.

Polar or water soluble dyes may be employed, as well as non-polar dyes which are slowly soluble in the resinous menstruum. Water soluble dyes are examples of the polar dyes which may be employed and are slowly dissolved and will migrate slowly without uniform diffusion.

If staining of the granular carrier is desired to make it pronounced in the menstruum of resin, then the granules are soaked for some time in the dye before being coated with the slowly soluble dye. This superficial staining forms distinctively discernible nodules integrally of the mass of pearly material finally made.

Several methods may be employed for forming a sheet of the resinous material from which button blanks may be punched, drilled, sawed or cut.

For the formation of a sheet by the centrifugal method, generally referred to in the United States Patent to Clewell, No. 2,265,226, Dec. 9, 1941, the procedure is as follows, utilizing in the example given a drum or cylinder having an internal diameter of 12", a length of 16½", with provision for rotation up to at least 800 r.p.m. In the following example, the drum is rotated at 130 r.p.m. with the object of making a sheet of 0.150" in thickness and a total of 1800 grams of resin mix.

The first layer is made by adding the catalyst content to 400 grams of formulation under Part I, which is the substratum, and including 1.5% of a wax solution (5% refined paraffin wax in styrene monomer). This material is added just prior to the next step and in order to form a tack-free gelled surface. Thereupon the resin mix is poured into the rotating cylinder or drum at a viscosity of 1000 centipoises at 25° C. to secure an even distribution of the batch on the drum surface. The rotation may be initially speeded up to facilitate uniform distribution and up to 260 r.p.m. may be employed for a brief period. The viscosity of the resins may be in the range of 800 to 2500 centipoises at 160 r.p.m. After distribution, the cylinder or drum is rotated at 130 r.p.m. for five to ten minutes. The resin, during this time, becomes gelled, with a tack-free surface. While I prefer a viscosity of the resin of 1000 centipoises, the range of viscosity for this as well as the final layers or any single layer may vary from liquid to 250,000 centipoises, with heating provisions for the more viscous compounds.

While in the tack-free condition, the surface layer as per Parts II and III is applied over the substratum layer. This is done by separately catalyzing 1400 grams of the formulation in accordance with Part II, minus the methylethylketone peroxide solution and the wax solution as given. The peroxide mentioned, in quantities of 1 to 2% of the solution and 1.5% of a 5% wax solution are added to the 1400 grams of Part II just before use and mixed. After about thirty seconds of mixing, there is added the colored particles of Part III in an amount of 0.7% of the weight of Part II which are mixed therein for two seconds. The combined material is then poured over the substratum layer in the drum, which layer has already reached the gelled, tack-free condition as above described. Rotation is maintained as before for about five to ten minutes, until the layers reach a Shore hardness of 40. Then the deposit of layers is cut along the generatrix of the cylinder, if separators or partitions have not already been included along the generatrix. If the latter have been included, the partitions are lifted out, to pry out the layers.

The material in the drum, while still soft, is removed from the drum or barrel and unfolded to form a flat rectilinear sheet. The sheets so produced may immediately be transferred to a stamper, from which blanks for buttons are cut, or stored for such purpose, if a sawing operation is to be employed.

While a condition of limpness may be effected for ready stamping of the blanks, extremely thin layers which may be employed for certain purposes, as veneering, may be desired, and the polymerization may progress to a greater degree, or even almost to complete polymerization or cure, if partitions are employed, along which sections the cylinder may be separated, to permit ready removal of the layers from such sections of the drum. With thermoplastic resins, heat may be used to straighten out the sheets.

The cut disks may be cured at room temperatures, and may be turned or finished before complete polymerization to the irreversible or fully cured stage has taken place, or they may be cured to the final stage and then finished in the usual way.

While I have shown and prefer a multi-layered sheet utilizing a substratum which may be opaque, translucent or even transparent in that this layer may carry a contrasting or fortifying hue to enhance the overlying layer of a mixture of Parts II and III, it will be understood that a single layer formed of the components of Parts II and III may be utilized where a finished effect of uniform nature is desired.

It will also be understood that while the drum may be finished with a glass-smooth mirrored surface, various effects for the multi-layered or the single layered product may be employed, utilizing a pebbled or grained or roughened surface.

In combining the color carrier or mottler with the type of dye as described, there is effected a relative movement of the colored particles to the menstruum of partially gelled polyester resin, which relative movement effects a slow migration of the slowly soluble dye along the path of movement of the particles and resin to each other, without uniform dissolution. This action, coupled with the presence of the granular particles of cured polyester resin creates small tubercles or nodules of irregular shape throughout the body of the layers which have been formed, with striations or mottlings in accordance with the manner in which the distribution of the layers in the rotating drum or movement of the particles and the menstrum of resin in cell casting are effected. The small, round eminences themselves merge into the menstruum, more or less to lose their identity of outline but create flow lines of movement which are tinted to be detected around the particles as satiny highlights and streaks of more pronounced integral sheen. Both the nodules which are completely embedded and the flow lines, colored by the migrating dye, or left uncolored as a result of relative movement, enhance and are enhanced by the nacreous component which has been added to give the integral sheen, to simulate the attractive orient of mother-of-pearl.

It will be observed that then producing sheets for making smaller buttons, a higher percentage of Part III will be employed, and conversely, when producing sheets for making larger buttons, a lower percentage of Part III is required to obtain greater realism in the final product.

Thus, the quantity of dye added depends on the size of the button to be made in order to distribute the particles over the surface of the button with due regard to its size and thickness. For example, in a 55 ligne button, 6 grams of particles coated as described are added for 1000 square inches of sheeting from which the blanks are cut. For a 45 ligne button, 7 grams of particles per 1000 square inches are used. For a 36 ligne button, 8 grams of particles per 1000 square inches are used. For a 30 ligne button, 10 grams of particles per 1000 square inches are used.

It will also be understood that the Parts II and III may be added to Part I to result in the formation of predetermined striations, or, by periodic interruption, secure a more mottled or localized area of color effects.

It will also be understood that the size of the particles may vary with the thickness of the sheet which is desired, where products with pearlized effects other than button blanks are to be produced, such for example, as disks, dishes.

Other polymerizing materials may be treated in accordance with the foregoing invention, among which are the esters of a-chloroacrylic acid such as the methyl, ethyl, propyl, butyl, hexyl, octyl, cyclohexyl, methylcyclohexyl, benzyl, phenyl and tolyl esters, the polyhydric alcohol esters such as glycol di-a-chloroacrylate, and the unsaturated esters such as allyl or methallyl a-chloroacrylate.

The choice of menstruum of the polymerizable material is made with due regard to the time of polymerization and the addition of the dye granules or of a granular carrier to secure a relatively slow solution so that the path of movement of the particles to the menstruum causes very slight migration of the color effects, to prevent complete and uniform diffusion of the dye in the menstruum.

The resins that may be chosen are preferably those which may be cured to an intermediate stage, where removal from the drum in the soft or limp condition is possible without tearing or without loss of body texture for handling but which may be subsequently cured by known methods to the irreversible condition. However, thermoplastic materials may also be treated, with due regard to the use to be made of polymerizable substances.

Likewise it will be understood that while I have shown the formation of the layers and sheets by means of a centrifugally rotating drum, other known procedures for making seets, such as by the cell casting method, the extrusion method or molding method may be employed, utilizing again the relative movement of the menstruum and dye particles or carrier particles to each other as the influence to secure effects simulating the coloring and mottling and striations of mother-of-pearl, over and above that resulting from the mere use of nacreous material.

It is to be noted that with a change in temperature or light factors, and with a variation of the resinous materials, modification in accordance with the characteristics of the resins and their responsiveness to temperature and to actinic rays may also be required.

While I have described the drum centrifugal casting method in detail as the means for causing a relative movement of the slowly soluble dye particles and the menstruum of resins, to striate or mottle the resinous mass to enhance the integral sheen of the nacreous material, other forces for accomplishing this result will be apparent. For cell casting, for example, the gravitational movement of the batch in the cell or the addition of the carrier particles to the cell partially filled with the main base may be used to effect the desired result. Further effects may be produced by reciprocal movement in the plane of the cell during polymerization so that while orienting the nacreous material, the relative movement for striating is effected.

By the foregoing invention, new and unusual effects are produced in products made from synthetic resins, having not only integral sheen but the desirable orient of natural mother-of-pearl with its color and tubercles and variegated effects.

Having thus described my invention and illustrated its use, what I claim as new and desire to secure by Letters Patent is:

1. The method of forming an ornamental plastic article comprising the steps of providing a liquid batch of flowable polyester resin having nacreous filler dispersed therein, introducing into said batch at spaced points a plurality of solid carrier particles having a dry surface coating comprising a dye slowly soluble in said liquid resin, moving said carrier particles through said liquid batch and causing said batch to harden.

2. The method of forming an ornamental plastic article comprising the steps of providing a batch of relatively liquid, transparent polymerizable resin having nacreous filler material dispersed therein, introducing into said batch at spaced points a plurality of solid carrier particles of a size in excess of the size of said filler material, said particles having a dry surface coating comprising a dye slowly soluble in said liquid resin, moving said carrier particles through said liquid batch and thereafter causing said batch to harden prior to homogeneous dispersion of said dye.

3. The method of forming an ornamental plastic article comprising the steps of providing a liquid batch of relatively transparent polymerizable resin having a nacreous filler incorporated therein, introducing into said batch at spaced points a plurality of solid carrier particles having a dry surface coating of a dye soluble in said resin, causing said particles to move along paths within said batch whereby increments of said dye are transferred from said particles to said batch along said paths, and polymerizing said batch prior to homogeneous dispersion of said transferred dye.

4. The method of forming an ornamental plastic article comprising the steps of providing in a container a liquid batch of relatively transparent polymerizable resin having a nacreous filler incorporated therein, introducing into said batch at spaced points a plurality of solid carrier particles having a dry surface coating of dye material soluble in said resin, moving said container as a unit, thereby to cause said particles to move along paths within said batch whereby increments of said dye are transferred from said particles to said batch along said paths, and thereafter causing said resin to cure to the hardened condition thereof.

5. The method of forming an ornamental plastic sheet which comprises the steps of providing a liquid batch of relatively transparent polyester resin having nacreous filler incorporated therein, introducing into said batch a plurality of solid carrier particles having a dry surface coating comprising a dye soluble in said resin, flowing said batch over a support surface, and thereafter curing said batch to the hardened condition thereof.

6. The method of forming an ornamental plastic article which includes the steps of providing a liquid batch of relatively transparent, unsaturated polyester resin having nacreous filler incorporated therein, depositing said batch in a form, incorporating into said batch a plurality of solid carrier particles having a surface coating comprising dry dye soluble in said resin, moving said form to cause said batch to conform to the configuration thereof and to induce relative movement of said particles within said batch, and thereafter curing said resin batch to the hardened condition thereof.

7. The method of forming an ornamental plastic article comprising the steps of providing a liquid batch of flowable polyester resin having nacreous filler dispersed therein, introducing into said batch a plurality of solid carrier particles having a dry surface coating of a dye soluble in said resin, moving said particles along paths within said batch whereby traces of said dye remain in said batch along said paths, and thereafter hardening said batch.

References Cited by the Examiner

UNITED STATES PATENTS

| | | | |
|---|---|---|---|
| 2,680,103 | 6/1954 | Nack et al. | 260—40 |
| 2,863,783 | 12/1958 | Greenstein | 260—29.6 |
| 2,941,895 | 6/1960 | Haslam | 106—291 |
| 3,219,734 | 11/1965 | Mattin | 264—73 |

ALEXANDER H. BRODMERKEL, *Primary Examiner.*

MILTON STERMAN, WILLIAM H. SHORT, DANIEL J. ARNOLD, *Examiners.*

J. ZIEGLER, B. SNYDER, A. H. KOECKERT,
*Assistant Examiners.*